(12) United States Patent
Kellens et al.

(10) Patent No.: US 10,647,077 B2
(45) Date of Patent: May 12, 2020

(54) VEGETABLE OIL EXTRACTION IMPROVEMENT

(71) Applicant: Desmet Ballestra Engineering n.v./s.a., Zaventem (BE)

(72) Inventors: Marc Kellens, Muizen (BE); Etienne Le Clef, Wezembeek-Oppem (BE); Timothy G. Kemper, Marietta, GA (US)

(73) Assignee: Desmet Ballestra Engineering n.v./s.a., Zaventrem (BE)

( * ) Notice: Subject to any disclaimer, the term of this patent is extended or adjusted under 35 U.S.C. 154(b) by 719 days.

(21) Appl. No.: 15/045,669

(22) Filed: Feb. 17, 2016

(65) Prior Publication Data

US 2016/0243783 A1     Aug. 25, 2016

(30) Foreign Application Priority Data

Feb. 19, 2015 (GB) .................................. 1502759.2

(51) Int. Cl.
 *B30B 9/02* (2006.01)
 *B30B 15/34* (2006.01)
 (Continued)

(52) U.S. Cl.
 CPC ............ *B30B 15/34* (2013.01); *A23K 20/147* (2016.05); *B30B 9/02* (2013.01); *B30B 9/125* (2013.01);
 (Continued)

(58) Field of Classification Search
 CPC .. B30B 9/02; B30B 9/12; B30B 9/125; B30B 9/14; B30B 9/16; B30B 15/34;
 (Continued)

(56) References Cited

U.S. PATENT DOCUMENTS 2,778,206 A * 1/1957 Wilson ............... B61D 27/0027
 62/62
3,833,628 A 9/1974 Pike et al.
 (Continued)

FOREIGN PATENT DOCUMENTS

CA      2260614 A1    7/2000
CN   101812368 A      8/2010
 (Continued)

OTHER PUBLICATIONS

Timothy G. Kemper, Bailey's Industrial Oil and Fat Products, Sixth Edition, Six Volume Set. Edited by Fereidoon Shahidi. Copyright # 2005 John Wiley & Sons, Inc.*
 (Continued)

*Primary Examiner* — Adam J Eiseman
*Assistant Examiner* — Bobby Yeonjin Kim
(74) *Attorney, Agent, or Firm* — Wegman Hessler

(57) ABSTRACT

The present invention relates to an apparatus and a process for subjecting oleaginous vegetable material to a continuous prepressing for extracting at least part of the oil contained in said oleaginous vegetable material and producing a cake comprising an at least partially de-oiled oleaginous vegetable material. The apparatus comprises a mechanical prepress for mechanically compressing said oleaginous vegetable material, wherein the prepress is provided with a cake discharge for discharging the cake to a cooler. The cooler comprising means for subjecting the cake to a downward movement, and means for supplying a coolant gas, preferably air, in a counter-current flow to the downward movement of the cake with the purpose of cooling the cake.

19 Claims, 1 Drawing Sheet

(51) Int. Cl.
*C11B 1/06* (2006.01)
*C11B 1/04* (2006.01)
*A23K 20/147* (2016.01)
*B30B 9/12* (2006.01)
*A23K 10/18* (2016.01)

(52) U.S. Cl.
CPC .................................... *C11B 1/04* (2013.01); *C11B 1/06* (2013.01); *A23K 10/18* (2016.05)

(58) Field of Classification Search
CPC ........ A23K 10/18; A23K 20/147; C11B 1/04; C11B 1/06
See application file for complete search history.

(56) References Cited

U.S. PATENT DOCUMENTS

| | | | | |
|---|---|---|---|---|
| 4,190,577 | A * | 2/1980 | Steele | C11B 1/04 426/615 |
| 4,298,540 | A * | 11/1981 | Youn | C11B 1/10 554/13 |
| 4,456,556 | A * | 6/1984 | Grimsby | C11B 1/108 554/13 |
| 4,457,869 | A * | 7/1984 | Grimsby | C11B 1/108 554/21 |
| 4,515,726 | A * | 5/1985 | Sullivan | C11B 1/108 554/13 |
| 4,523,388 | A | 6/1985 | Cuel | |
| 5,620,728 | A * | 4/1997 | Langley | B01D 11/023 426/312 |
| 6,103,918 | A | 8/2000 | Dahlen | |
| 6,518,443 | B1 * | 2/2003 | Beyer | C11B 1/04 554/175 |
| 6,955,831 | B2 | 10/2005 | Higgs et al. | |
| 8,951,593 | B2 * | 2/2015 | Van Den Schrieck | A23D 9/04 426/417 |
| 2002/0106431 | A1 * | 8/2002 | Martel | A23D 9/00 426/481 |
| 2006/0051489 | A1 | 3/2006 | Higgs et al. | |
| 2013/0130343 | A1 * | 5/2013 | Purtle | C12P 7/14 435/162 |
| 2014/0186504 | A1 | 7/2014 | Van Den Schrieck et al. | |
| 2014/0287124 | A1 * | 9/2014 | Goto | A23N 17/005 426/574 |
| 2015/0240184 | A1 * | 8/2015 | Le Clef | C11B 1/04 554/9 |
| 2017/0021582 | A1 * | 1/2017 | Ceccarelli | C02F 11/121 |
| 2017/0354178 | A1 * | 12/2017 | Armenjon | A23L 33/17 |

FOREIGN PATENT DOCUMENTS

| | | | | |
|---|---|---|---|---|
| CN | 202337019 | U | | 7/2012 |
| DE | 102007053109 | A1 | | 5/2009 |
| EP | 2 062 963 | A2 | | 9/2008 |
| EP | 2062963 | A2 * | 8/2009 | ............... C11B 1/02 |
| EP | 2885980 | | * 12/2013 | ............... A23J 1/00 |
| UA | 76979 | C2 | | 3/2005 |
| WO | WO 98/01518 | A1 | | 1/1998 |

OTHER PUBLICATIONS

Homann Thorsten, EP 2062963 translation. Aug. 2009.*
Hammerl, Translation EP 2885980 (Year: 2013).*
Search Report Under Section 17(5) issued by the Intellectual Property Office in Britain dated Aug. 20, 2015 for Application No. GB1502759.2 filed Feb. 19, 2015.
International Search Report and Written Opinion dated Jan. 31, 2013 for PCT/EP2012/065604 filed Aug. 9, 2012.
International Preliminary Report on Patentability dated Feb. 18, 2014 for PCT/EP2012/065604 filed Aug. 9, 2012.
Schumacher, Heinz, "Preparation of Soybeans Prior to Solvent Extraction", Proceedings of the World Congress on Vegetable Protein Utilization in Human Foods and Animal Feedstuffs, Champaign, Illinois, Oct. 26, 1989, pp. 37-40.
Office Action dated May 20, 2019, issued in related German patent application No. 10 2016 001 510.1; 6 pages.

* cited by examiner

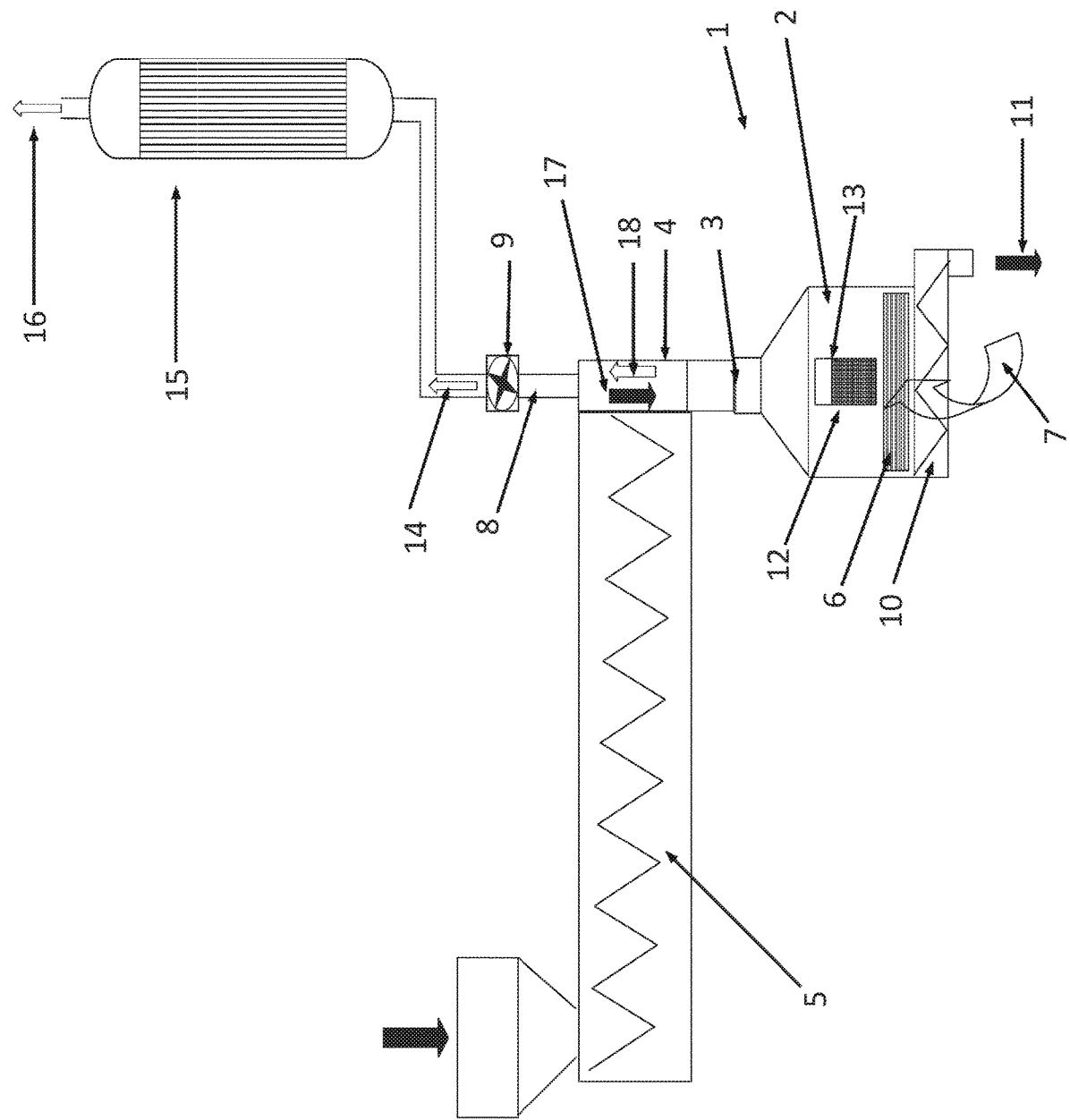

VEGETABLE OIL EXTRACTION IMPROVEMENT

CROSS-REFERENCE TO RELATED APPLICATIONS

This application claims the priority filing benefit of Great Britain Patent Application No. GB 1502759.2 filed Feb. 19, 2015. Each of the above listed applications is incorporated herein by reference.

FIELD OF THE INVENTION

This invention relates to an apparatus and a process for the extraction of oleaginous vegetable material, which is first extracted by a mechanical extraction and thereafter subjected to solvent extraction. In particular, the apparatus and process of the invention permit to significantly decrease the level of odoriferous components released by the apparatus to the atmosphere and further improve the performance of the solvent extractor. In particular, the milling defect and the residual oil content of the press cake resulting from the mechanical extraction, are reduced significantly.

BACKGROUND OF THE INVENTION

The two most common processes to extract edible oil from oleaginous vegetable materials such as seeds, beans, and nuts are the full press extraction process where mechanical screw presses are used to extract the oil by squeezing the oleaginous vegetable material under high pressure, and the solvent extraction process where a solvent is mixed with the oleaginous vegetable material to dissolve and extract its oil content. Solvent extraction inevitably requires a careful preparation of the oleaginous vegetable material comprising for example de-hulling, heating, flaking, and cooking. The solvent is usually hexane.

Full press extraction is found in small oil mills, but this mechanical process extracts only about 90% of the oil contained in the oleaginous vegetable material, which is unacceptable for larger oil mills processing commodities.

For oleaginous vegetable material containing a large proportion of oil, for example about 40% in weight, such as rapeseed or sunflower seeds, it is advantageous to realise the oil extraction in two steps: a partial mechanical extraction using a prepress followed by a solvent extraction using an extractor. As a matter of fact, the mechanical extraction can be seen as a preparation or a step of the preparation during which a significant fraction of the oil is extracted with a controlled mechanical process. For rapeseed and sunflower seed for example, it has been found advantageous to squeeze about two third of the oil (66%) mechanically and to extract the remaining oil by solvent extraction.

Accordingly, for such oleaginous vegetable material containing a large proportion of oil, the first oil extraction step is a mechanical extraction using a prepress that will produce a prepress-oil and a prepress-cake that from now will be designated as "cake". The cake still contains a substantial amount of oil, typically about 15-25% in weight. The second step is the solvent extraction of the cake, whereby a meal is produced that is substantially free of oil (ideally below 0.5% in weight) and a miscella rich in oil. During the prepressing step, the vegetable oleaginous material is subjected to considerable friction and compression forces generating significant heat surge. Consequently, the cake exits the prepress typically at a temperature of 105° C. to 115° C. To be complete, upon exit of the prepress, a quick cooling due to flash evaporation of a fraction of the moisture naturally present in the oleaginous material takes place and brings the cake temperature down to about 100° C.

In some oil mills, the hot cake is introduced in the solvent extractor without methodical and controlled cooling, and therefore its temperature exceeds the boiling point of the solvent (usually hexane) used in the solvent extractor. This is not a safety issue as long as the extractor is equipped with a properly sized condenser that will condense any evaporated solvent.

However, the real issue is the fragility of the cake when this one is hot. As a matter of fact, the prepressing should be an excellent preparation to the solvent extraction since most of the cells containing the oil are ruptured by the considerable friction and compression forces generated in the prepress. Furthermore, as previously mentioned, at the exit of the prepress, the water flashes, creating a porous structure that should be ideal for solvent diffusion inside the cake. However, this ideal structure is ruined because the cake must be transported hot over a long distance from the prepress to the extractor. Unfortunately, when hot, this one is very fragile and is broken into small pieces and fines (dust) during the long transport from the prepress to the extractor. Indeed, typically, the extractor is located in a dedicated building where specific safety rules do apply in reason of the explosive risk generated by the hexane. Therefore, typically, an oil mill facility will include several prepresses located in the preparation building and one extractor located in a dedicated and restricted access building. Accordingly, due to the long transport of the fragile hot cake, a lot of fines are generated and consequently poor percolation is observed which is at the root of suboptimal solvent extraction performances of the extractor, such as long residence time and/or high residual oil and/or decreased capacity. Indeed, in the field of solvent extraction, it is well known that the occurrence of fines (in the material to be solvent extracted) have a negative impact on solvent percolation which is of outmost importance for the performance of a percolation solvent extractor.

Therefore, to remedy to the situation described above, in most oil mills, the cake is methodically cooled at about 60-80° C. in a horizontal cooling tunnel before being introduced in the solvent extractor. The cake is introduced through a feeding hopper and while being slowly transported through the horizontal cooling tunnel on a moving belt for example, it is slowly cooled by a stream of cross flow air which is then released to the atmosphere. The cooled cake is then conveyed to the solvent extractor.

Nevertheless, such cake cooling as currently realized in a horizontal cooling tunnel is unsatisfactory. Indeed, before the actual cooling of the cake is realized, said cake must be transported from the prepress to the horizontal cooling tunnel. As a matter of fact, oil mills are equipped with several prepresses and only one horizontal cooling tunnel, and therefore, the transport of the cake will require several conveyors and will be relatively long and thus the cake will already have the time to be broken down into small pieces and fines before being cooled and stiffened. Consequently, even if a limited improvement of the percolation rate is observed, the solvent extractor performance remains suboptimal in terms of residence time and/or capacity and/or residual oil remaining in the extracted vegetable material. The suboptimal performance of the extractor originate from the low percolation rates induced by too many fines. Fines are created by too much conveyance of the hot, fragile cake before this one is cooled and stiffened.

Another issue associated to the horizontal cooling tunnel currently practised in the field is that the air used in the air cooler is released to the atmosphere and pollutes the surroundings with malodourous components especially when processing rapeseed. It is technically possible to treat the air to remove most of the malodorous components with for example a bio-filter, but this option is particularly expensive because the air volume to be treated is very large. Typically for a horizontal cooling tunnel currently available, 300 m$^3$ of air is needed per ton of seed (or 425 m$^3$ of air per ton of cake). Therefore, for an oil mill having a capacity 750 ton per day, it means that 225,000 m$^3$ are released daily to the surroundings or must be treated a high cost.

Therefore, there is a need in the art for an improved equipment and process for the transport of the cake from the mechanical prepress to the subsequent solvent extraction, that permits to improve the subsequent solvent extraction performance and lessen the release of malodorous components into the surroundings.

OBJECT AND ADVANTAGES OF THE INVENTION

It is an object of the invention to provide an improved apparatus and process for cooling the press-cake which results from the mechanical extraction of the oleaginous vegetable material, and for transporting that cake to a solvent extraction process (extractor) to complete the oil extraction.

The present invention presents the advantage that the performance of a solvent extraction of a press-cake that has been treated in the device of this invention or according to the process of this invention, may be improved and that the release of malodorous components to the surroundings may significantly be reduced. The present invention presents the additional advantage that overcome the disadvantages and shortcomings of the cake cooling and transportation equipment and process of the prior art.

It is an advantage of the invention to provide an equipment and process leading to higher percolation rate of the solvent during the solvent extraction compared to existing practice.

It is a further advantage of the invention to reduce the release of malodorous components compared to existing practice.

It is a further advantage of the invention to provide a process and equipment leading to the reduction of the residual oil remaining in the solvent extracted vegetable material.

Further advantages of the present invention will become apparent from the description hereinafter.

SUMMARY OF THE INVENTION

It has been found that the above object is met with an apparatus for subjecting oleaginous vegetable material to a continuous prepressing for extracting at least part of the oil contained in said oleaginous vegetable material and producing a cake comprising an at least partially de-oiled oleaginous vegetable material, wherein the apparatus comprises a mechanical prepress for mechanically compressing said oleaginous vegetable material, wherein the prepress is provided with a cake discharge for discharging the cake to a cooler, the cooler comprising means for subjecting the cake to a downward movement, the cooler further comprising means for supplying a coolant gas, preferably air, in a counter-current flow to the downward movement of the cake with the purpose of cooling the cake.

At the exit of the prepress the cake is moving in downward direction, in particular falling by gravity directly into the cooler, where it is cooled by rising coolant gas, in particular air. It has been surprisingly observed that this cooling equipment and method has not only a cooling effect but also a quenching or crisping effect on the cake. Accordingly, the cake is cooled very rapidly, in particular its surface so that a crust is formed around each particles of cake. The crisping keeps the cake agglomerated so that its original cake shape is preserved and does not crumble into fines and small loose particles.

It has been observed that the use of a cooler as described above, in particular a cooler which extends in upright direction, more particularly a vertical cooler, according to this invention is advantageous over the horizontal cooling tunnel of the prior art for the performances of downstream solvent extraction. Higher percolation of the solvent, higher throughput and/or lower residual oil remaining in the extracted oleaginous material have been observed.

It has been surprisingly observed that in comparison to the horizontal cooling tunnel of the prior art, the cooler of this invention permits to significantly reduce the volume of air needed to cool the cake.

BRIEF DESCRIPTION OF THE FIGURE

The FIGURE is a representation of an embodiment of the equipment and process according to the invention. However, the invention is not limited by the FIGURE but only by the claims.

DEFINITIONS

Prepress: In the context of the invention, prepress specifically refers to an equipment for the partial mechanical extraction of the oil contained in vegetable oleaginous material such as rapeseed or sunflower seed. In the field, it is sometimes referred as press or expeller. Example of this equipment is the Sterling 800 prepress of Desmet Rosedown. Harburg-Freundenberger Maschinenbau GmbH is another manufacturer of such equipment.

Cake: In the context of the invention, cake specifically refers to the partially de-oiled solid material exiting the prepress, which results from the mechanical pressing of vegetable oleaginous material. In the field, it is sometimes referred to as press-cake or prepress-cake but for simplicity the term "cake" is used.

Extractor: In the context of the invention, extractor refers specifically to a counter current percolation solvent extractor. Solvent is preferably commercial hexane. Examples of such extractors are the LM or Reflex from Desmet Ballestra which are deep bed extractors or extractors manufactured by Crown Iron Works which are shallow bed extractors.

Horizontal cooling tunnel: In the context of the invention, horizontal cooling tunnel refers specifically to an equipment where cake is introduced through a feeding hopper and while transported horizontally through on a moving belt for example it is cooled by a stream of cross flow air which is then released to the atmosphere. Because the cross flow air is used, large air volume are needed, typically 300 m$^3$ of ambient air (20° C. 90% relative humidity) per ton of cake. Example of such horizontal cooling tunnel is the Series 900, or Series 1800, or Series 2700 manufactured by Alloco under the generic name of "Dryer/Cooler".

Cooler: In the context of the invention, cooler refers specifically to an equipment where the cake is cooled by a counter-current flow of air. The cooling air is rising from a lower part of the cooler, in particular from the bottom, to an upper part of the cooler, in particular the top of the cooler, and the cake is slowly moving downward from the top of the cooler to the bottom. In the cooler, both the air and the cake are moving vertically, i.e., in height direction, but in opposite directions and therefore it could be designated as vertical cooler or upright extending cooler or vertical, upright extending cooler, but for simplicity, the term "cooler" will be used from now.

DETAILED DESCRIPTION

As illustrated on the FIGURE, the cooler (1) comprise a cooling vessel (2) which is typically a metallic vessel preferably of square or rectangular section, and equipped with a top opening (3) for the introduction of the hot cake. The square or rectangular section is advantageous from a construction point of view, but the invention is not limited to such type of section and encompasses cooling vessels with circular or oval cross section, or any other cross section as well. The top opening (3) is connected at the cake discharge (4) of the prepress (5), preferably a direct connection is established. One or more louvers (6) are placed on the bottom portion of the sides, for example the upright extending sides, of the cooling vessel so that external ambient air (7) can enter into the cooling vessel, but the cake inside the cooling vessel cannot outflow. The invention is not limited to louvers, any opening considered suitable by the skilled person, allowing air passage but preventing the outflow of the cake, such as for example a grid will fall in the scope of the invention. The air exhaust of the cooler is located just above the cake outlet hood (8) itself, and said air exhaust is connected to a suction fan (9) for example. The use of a suction fan is preferred because a depression can be created inside the cooler, and such depression will favour the water evaporation, hence the evaporative cooling. A lower part, in particular the bottom of the cooling vessel, is fitted with a discharge system (10) typically twin variable speed screws counter rotating to transport the cooled cake (11) to the solvent extractor via conveyors (not shown). These twin variable speed screws are for the purpose of discharging the cooled cake while maintaining its level constant inside the cooling vessel. Large slow screws are preferred over other discharge mechanisms as they are more gentle on the cooled cake and do not generate large amount of fines. However, other discharge mechanisms fall also into the scope of the invention as long as they handle the cooled cake gently and do not generate large amount of fines. Downstream of the discharge system (10), 2-3 additional conveyors or more may be provided to take the cooled cake to the solvent extraction (not shown).

Therefore, in steady state operation, the quantity of cake being cooled inside the cooler remains constant. The volume of the cooling vessel is calculated to ensure a residence time of 1 to 20 minutes, preferably 1 to 10 minutes, more preferably of 2 to 10 minutes, even more preferably of 4 to 8 minutes. For a prepress processing 750T of rapeseed per day and generating 480T of cake per day, a cooling vessel of about 4 $m^3$ has been found sufficient. Its dimensions can be for example of 2 m×1 m×2 m (length×width×height). The height of material bed inside the cooling vessel is about 1.5 m which represents a volume of about 3 $m^3$ corresponding to a residence time of about 5 min in steady state operation. Typically, the cooler is equipped with known means to determine the level of material loaded inside the cooling vessel such as for example ultrasound level controller sensor. Optionally, in addition, sight glass (12) can be fitted on one or more sides of the cooling vessel in order to easily and visually determine the level of cake inside (13) the cooler. It must be noted that the size and shape of the cooler can be adapted to fit particular plant capacity and plant layout. Optionally, the heat contained in the hot air exiting (14) the cooler can be recovered in a heat exchanger (15) before being released to the atmosphere (16) or optionally treated to reduce malodorous components.

Ideally, the cooler is placed just below and at the elevation of the prepress cake discharge, and therefore, the hot cake (17) falls directly by gravity into the cooling vessel where it is cooled by rising air (18). This air (7) enters the cooling vessel by for example the louvers (6) and exits the cooler by one or more air exhaust(s) (8) in the prepress hood. The suction fan (9) power is set to obtain the desired air flow velocity. An air tight connection between the prepress and the vertical cooler is essential. The cooled cake exits the cooler through conveying twin screws mounted at the bottom of the cooling vessel. The velocity of the cooling air is adjusted in order to reach the target cooled cake temperature of about 70 to 80° C. It is not advisable to cool the cake to temperature below 70° C. Indeed, when transported from the cooler to the extractor, the cake temperature will further decrease of a few degrees centigrade. The cake temperature cannot be too low because it would then prevent azeotropic boiling in the extractor which removes surface moisture occurring during conveyance.

However, it is acceptable that the cooler is offset from the cake discharge (at the exit of the prepress) as long as the cake can fall by gravity inside the cooling vessel. Indeed, such offset may be necessary in some circumstances for example the lack of space when retrofitting existing facilities.

In the cooler, the cooling is realised with a counter flow of air. It has been surprisingly observed that, in comparison with the horizontal tunnel cooler of the prior art, a moderate air volume was efficient to reduce the temperature of the cake. Indeed, for a prepress processing 750 tons of rapeseed per day producing thus 530 tons of cake per day, and for a cooler with a cooling vessel of the dimension described above, an air volume corresponding to 50 to 200 $m^3$ per ton of cake has been found enough to reduce the temperature of the said cake from about 100° C. to about 80° C. (incoming air at 20° C., relative humidity 90%). Thus, the needed air volume is at least two times lower than the one required for the horizontal cooling tunnel currently used in the industry (425 $m^3$ of air per ton of cake). Hence, much lower volume of exhaust air is released to the atmosphere. Therefore, optional treatment of the exhaust air is more economical and/or efficient and thus potentially reducing the release of malodorous components to the surroundings.

Thus, the benefit of the cooler placed directly under the prepress is the reduction of the risk of cake destruction by conveyance before the cake has time to become cold and firm and a much smaller air volume necessary for adequate cooling. Indeed, the horizontal cooling tunnel as currently used in the field cannot be placed directly under the prepress. As mentioned before, oil mills are equipped with several prepresses and only one horizontal cooling tunnel, and therefore, the transport of the cake will require several conveyors and will be relatively long, and thus, the cake will already have the time to be broken down into small pieces and fines before being cooled and stiffened by a horizontal cooling tunnel. However, this arrangement aspect is not the only difference between the disclosed invention and the horizontal cooling tunnel currently in use in the field.

Indeed, a horizontal cooling tunnel is a shallow bed layer cooler since the cake bed is typically 0.3 m and the cooling air flows transversally to the cake. The cake moves horizontally, and the air flows vertically from top to bottom. In sharp contrast, the cooler of the invention is a deep bed cooler since the cake bed (13) has typically a height of 1.5 m, and the cooling air flows counter-currently to the cake. In the cooler of this invention, the cooling air is rising from bottom to top, and the cake is moving downward from top to bottom. In the cooler of this invention, both the cooling air and the cake are moving vertically but in opposite directions.

Those numerous differences result in a much more efficient cake cooling in the cooler of this invention. Indeed, the cooler placed directly under the press permits to provide a quenching or crisping effect: the surface of hot cake is directly cooled and thus confers some mechanical properties to each piece of the cake even though the core of an individual piece of the cake may be hotter. It is also believed that the cooler may lead to substantial evaporative cooling. Even if not fully understood, those mechanisms could explain that much less air is needed to achieve the desired cooling of the cake by using the cooler of this invention compared to the existing horizontal cooling tunnel in use currently in the field.

It has further been observed that the solvent extraction is more efficient when it processes a cake cooled with the cooler as described. The percolation rate improves substantially and residual oil content of the extracted material is decreased accordingly. The reason of this improvement is most probably the reduction of the fines that is known in the industry to highly impact the solvent percolation rate in the extractor. The solvent percolation rate improvement is easily inferred from the output of the solvent circulation pumps of the extractor. All parameters being kept constant, the invention as described, allow a decrease of the residual oil content of at least 0.1 to 0.2%. Even if seemingly modest, this improvement translates in substantial gain since oil mills typically process large volume of seed in the range of 1000 tons per day. Accordingly, if such oil mill is in activity 350 days per year, decreasing the residual oil content of 0.1% will translate in a gain of nearly 190 tons of oil per year generating about US $130,000 of additional income. Indeed, an oil mill processing 1000 tons per day of sunflower seeds will produce approximatively 880 tons per day of de-hulled seeds and 120 tons per day of hulls. Subsequently, 880 tons per day of de-hulled sunflower seeds will be mechanically pressed and will yield approximatively 660 tons per day of cake and 220 tons per day of oil (press oil). Subsequently, 660 tons per day of cake will give approximatively 535 tons per day of extracted meal with for example of residual oil content of 1% (ROC) and 125 T per day of oil (solvent extracted oil). Consequently, if the cooler as described herein is able to reduce the ROC of 0.1%, the oil gain per year will be of 0.1/100×535 tons per day×350 days per year=187 tons per year of gained oil. With a price difference of US $700 between sunflower oil and sunflower meal, this oil gain translates into an extra revenue of US $131,000 per year for a seemingly modest ROC reduction of 0.1%.

The present invention encompasses means to further increase the cooling rate of the cake such as for example the use of pulsated cooling air flowing through the cooler. Air pulsing frequencies between 0.1 and 100 hertz, preferably from 1 to 20 hertz, even more preferably from 2 to 5 hertz may be appropriate. As a matter of fact, the skilled person will be capable of selecting the appropriate frequency and amplitude taking into account the oleaginous vegetable material to be processed and the dimensions and shape of the cooler. A particular mode is the resonance. Resonance is the tendency of a system or material to oscillate with greater amplitude at some frequencies than at others. Frequencies at which the response amplitude is a relative maximum are known as the system or material resonant frequencies, or resonance frequencies. At these frequencies, even small periodic driving forces can produce large amplitude oscillations, because the material stores vibrational energy. Best performances can be observed at resonance frequencies but not systematically. The air pulsation can be created using a fan with a variable speed or by a rotating valve or by any suitable means known in the art. It has been surprisingly observed that by using pulsated air to cool the cake, the same cake cooling can be achieved with less air. Typically 5 to 20% less air per ton of cake is needed when a pulsated cooling air is used. It is believed that the pulsation increases the thermal exchange between the air and the cake and results in a further reduction of the air volume needed to cool a given amount of cake to a target temperature hence a faster cooling. It is also believed that the pulsation of the cooling air could increase the air distribution between cake particles and the uniformity or homogeneity of the cooling. It is also believed that the air pulsation may avoid or reduce air channelling that may occur in the cooler when non-pulsated air is used.

Further cooling rate increases of the cake can be realized by using an additional cooling agent such as but not limited to nitrogen, carbon dioxide, water, alcohol. The additional cooling agent can be in solid, liquid or gaseous state. For example, additional cooling agent can be introduced in the prepress itself or at the prepress cake exit.

Another advantage of the cooler, according to the invention, is that it exhausts considerably less air than the horizontal cooling tunnel currently in use in the industry, but this air is significantly hotter and more humid due to counter-current flows of the air and cake. Compared to the horizontal cooling tunnel of the prior art, the air flowing through the cooler becomes hotter and therefore carries more moisture. Hence, its energy density is significantly higher, and this hot moist air is particularly suitable for energy recovery as described in US2014/0186504A1. This application describes the use of a tubular condenser where moist hot air and/or hot vapours are condensed inside the tubes of a tubular condenser and generate thus a stream of hot water that is recycled to preheat the rapeseed during the seed preparation part of the extraction process. During the condensation of the moist hot air and/or hot vapours, a part of the malodorous component will condense as well and therefore will not be released to the atmosphere which is particularly advantageous. The fan (or other air suction devices) pulling the air through the cooler can be positioned between said cooler and the tubular condenser or at the exit of the tubular condenser. Alternatively, two fans (or other air suction devices) can be used: one between the cooler and the tubular condenser and a second one at the exit of the tubular condenser.

The cooler as described above yields a cooled cake, and its use is specifically advantageous when used in conjunction with a prepress. Therefore, the present invention may specifically relate to the use of a cooler as described above in conjunction with a prepress as described above. More specifically, the invention encompass an apparatus for subjecting oleaginous vegetable material to a continuous pre-pressing for extracting at least part of the oil contained in said oleaginous vegetable material and producing a cake comprising an at least partially de-oiled oleaginous vegetable material, wherein the apparatus comprises a mechanical prepress for mechanically compressing said oleaginous vegetable material, wherein the prepress is provided with a cake discharge for discharging the cake to a cooler, the cooler comprising means for subjecting the cake to a downward movement, the cooler further comprising means for supplying a coolant gas, preferably air, in a counter-current flow to the downward movement of the cake with the purpose of cooling the cake.

The invention further encompasses the apparatus as described above wherein said cooler is positioned below the cake discharge of the prepress to allow the cake exiting the prepress to fall freely by gravity inside said cooler.

The invention further encompasses the apparatus as described above wherein said cooler comprises a vessel, i.e., a cooling vessel comprising an entrance for the introduction of the cake inside said cooling vessel, said entrance being located essentially at the top of said vertical cooler.

The invention further encompasses the apparatus as described above wherein said cooler comprise a cooling vessel comprising an exit for the withdrawal of the cooled cake, said exit being located essentially at the bottom of said cooling vessel.

The invention further encompasses the apparatus as described above wherein said cooler further comprises at least one first opening allowing air entrance inside said cooler and at least one second opening connected to an air suction device.

The invention further encompasses the apparatus as described above wherein said at least first opening is an air louver located essentially in the bottom of said cooler but above the said exit for the withdrawal of the cooled cake.

The invention further encompasses the apparatus as described above wherein the exit for withdrawal of the cooled cake comprise at least one conveying screw.

The invention further encompasses the apparatus as described above wherein the exit for withdrawal of the cooled cake comprise at least one moving belt.

The invention further encompasses the apparatus as described above wherein said cooler is able to decrease the temperature of the said cake exiting the prepress of at least 20° C.

The invention further encompasses the apparatus as described above wherein said residence time inside said cooler is at least one (1) minute but does not exceed ten (10) minutes.

The invention further encompasses the apparatus as described above wherein said cake is cooled by a flow of ambient air.

The invention further encompasses the apparatus as described above wherein the temperature of ambient air entering the said cooler is at least ten (10) degree centigrade but does not exceed thirty (30) degree centigrade.

The invention further encompasses the apparatus as described above wherein the volume of air flowing through said cooler is at least 50 m$^3$ per ton of cooled cake.

The invention further encompasses the apparatus as described above wherein the volume of air flowing through said cooler does not exceed 200 m$^3$ per ton of cooled cake.

The invention further encompasses the apparatus as described above and wherein the air exit of said cooler is connected to a heat exchanger device.

The invention further encompasses the apparatus as described above wherein the air exit of said cooler is connected to a tubular condenser.

The invention further encompasses the apparatus as described above wherein the air exit of said cooler is connected to a tubular condenser and said air exiting said cooler flows inside the tubes of said tubular condenser.

The invention further encompasses the apparatus as described above wherein air flowing through said cooler is pulsated.

The invention further encompasses the apparatus as described above wherein an additional cooling agent such as for example nitrogen, carbon dioxide, water, alcohol either in gaseous, liquid or solid form is added in the prepress or at the cake exit of the prepress.

The invention further encompasses the apparatus as described above wherein said oleaginous vegetable material, that can be dehulled, is selected amongst the botanical families of the compositae (for example sunflower), cruciferae (for example rape), malvaceae (for example cotton), rozaceae (for example almond tree and hazel tree), peduliaceae (for example sesame), vitaceae (for example grape seed), jugladaceae (for example nut tree), linaceae (for example flax), cucurbitaceae (for example pumpkin seeds), leufobiaceae (for example castor oil plant), solanaceae (for example tomato seeds and tobacco seeds) and arachis hypogaea (for example peanuts).

The present invention is particularly useful for the process of the continuous extraction of oleaginous vegetable material and yield to the advantages described previously.

Therefore, the invention further encompass the process for the continuous prepressing of oleaginous vegetable material comprising the steps of a) Subjecting an oleaginous vegetable material in a prepress to a mechanical prepressing to extract at least part of the oil contained in the oleaginous vegetable material, in particular at least 30%, and compressing said oleaginous vegetable material to produce a vegetable oil and a partially de-oiled cake of a oleaginous vegetable, b) cooling said cake, by subjecting the cake to a downward movement and by contacting the cake with a rising counter current flow of a coolant gas, in particular air.

The present invention in particular relates to a process for the continuous prepressing of oleaginous vegetable material comprising the steps of:

a) prepressing an oleaginous vegetable material to extract at least 30% of its oil content with a prepress equipped with at least one screw able to compress said oleaginous vegetable material to produce a vegetable oil and a partially de-oiled oleaginous vegetable material under the form of a cake exiting the prepress at the cake discharge of said prepress at a temperature of about 85° C. to about 115° C., b) and cooling said cake in a vertical cooler connected to the cake discharge of said prepress wherein said cake is cooled in a vertical cooler by a flow or air rising counter-currently to the cake to yield a cooled cake.

The invention further encompasses the process for the continuous prepressing of oleaginous vegetable material as described above wherein said vertical cooler is positioned below the cake discharge of the prepress to allow the cake exiting the prepress to fall freely by gravity inside said vertical cooler.

The invention further encompasses the process for the continuous prepressing of oleaginous vegetable material as described above wherein said vertical cooler is a vessel comprising an entrance for the introduction of the cake inside said vertical cooler, said entrance being located essentially at the top of said vertical cooler.

The invention further encompasses the process for the continuous prepressing of oleaginous vegetable material as described above wherein said vertical cooler comprises a vessel, i.e., a cooling vessel comprising an exit for the withdrawal of the cooled cake, said exit being located essentially at the bottom of said cooling vessel.

The invention further encompasses the process for the continuous prepressing of oleaginous vegetable material as described above wherein said cooler further comprises at least one first opening allowing air entrance inside said vertical cooler and at least one second opening connected to an air suction device.

The invention further encompasses the process for the continuous prepressing of oleaginous vegetable material as described above wherein said at least first opening is an air louver located essentially in the bottom of said cooler but above the said exit for the withdrawal of the cooled cake.

The invention further encompasses the process for the continuous prepressing of oleaginous vegetable material as described above wherein the exit for withdrawal of the cooled cake comprise at least one conveying screw.

The invention further encompasses the process for the continuous prepressing of oleaginous vegetable material as described above wherein the exit for withdrawal of the cooled cake comprise at least one moving belt.

The invention further encompasses the process for the continuous prepressing of oleaginous vegetable material as described above wherein said cooler is able to decrease the temperature of the said cake exiting the prepress of at least 20° C.

The invention further encompasses the process for the continuous prepressing of oleaginous vegetable material as described above wherein said residence time inside said cooler is at least one (1) minute but does not exceed ten (10) minutes.

The invention further encompasses the process for the continuous prepressing of oleaginous vegetable material as described above wherein said cake is cooled by a flow of ambient air.

The invention further encompasses the process for the continuous prepressing of oleaginous vegetable material as described above wherein the temperature of ambient air entering the said cooler is at least ten (10) degree centigrade but does not exceed thirty (30) degree centigrade.

The invention further encompasses the process for the continuous prepressing of oleaginous vegetable material as described above wherein the volume of air flowing through said cooler is at least 50 m$^3$ per ton of cooled cake.

The invention further encompasses the process for the continuous prepressing of oleaginous vegetable material as described above wherein the volume of air flowing through said cooler does not exceed 200 m$^3$ per ton of cooled cake.

The invention further encompasses the process for the continuous prepressing of oleaginous vegetable material as described above wherein the air exit of said cooler is connected to a heat exchanger device.

The invention further encompasses the process for the continuous prepressing of oleaginous vegetable material as described above wherein the air exit of said cooler is connected to a tubular condenser.

The invention further encompasses the process for the continuous prepressing of oleaginous vegetable material as described above wherein the air exit of vertical cooler is connected to a tubular condenser, and said air exiting said cooler flows inside the tubes of said tubular condenser.

The invention further encompasses the process for the continuous prepressing of oleaginous vegetable material as described above wherein the cooled cake exiting said cooler in continuously conveyed to a solvent extractor.

The invention further encompasses the process for the continuous prepressing of oleaginous vegetable material as described above wherein the air flowing through said cooler is pulsated.

The invention further encompasses the process for the continuous prepressing of oleaginous vegetable material as described above wherein an additional cooling agent such as for example nitrogen, carbon dioxide, water, alcohol either in gaseous, liquid or solid form is added in the prepress or at the cake exit of the prepress.

The invention further encompasses the process for the continuous prepressing of oleaginous vegetable material as described above wherein said oleaginous vegetable material contains about 40% of oil.

The invention further encompasses the process for the continuous prepressing of oleaginous vegetable material as described above wherein said oleaginous vegetable material entering the prepress, which can be previously dehulled, is selected amongst the botanical families of the compositae (for example sunflower), cruciferae (for example rape), malvaceae (for example cotton), rozaceae (for example almond tree and hazel tree), peduliaceae (for example sesame), vitaceae (for example grape seed), jugladaceae (for example nut tree), linaceae (for example flax), cucurbitaceae (for example pumpkin seeds), leufobiaceae (for example castor oil plant), solanaceae (for example tomato seeds and tobacco seeds) and arachis hypogaea (for example peanuts).

The invention claimed is:

1. A process for the continuous prepressing of oleaginous vegetable material comprising the steps of:
   (1) subjecting an oleaginous vegetable material in a prepress to a mechanical prepressing, wherein said oleaginous vegetable material comprises oil, wherein said mechanical prepressing extracts at least 30% of the oil contained in the oleaginous vegetable material;
   (2) compressing said oleaginous vegetable material to produce a vegetable oil and a cake comprised of partially-deoiled oleaginous vegetable material, said cake exiting the prepress at a prepress discharge,
   (3) cooling said cake by subjecting the cake to a downward movement, and wherein said cake is cooled in a vertical cooler by a flow of a coolant gas rising countercurrently to the cake to yield a cooled cake, wherein the vertical cooler is placed directly under the prepress discharge, and wherein the vertical cooler provides a quenching or crisping of the cake, wherein the cake is directly cooled; and
   (4) subsequently transporting the cooled cake to a solvent extractor to extract residual oil from the cooled cake with a solvent, wherein the residual oil content (ROC) of the solvent extracted cooled cake is decreased by at least 0.1%.

2. The process according to claim 1, wherein the cake is supplied to the vertical cooler positioned below a discharge opening of the prepress, and the cake is allowed to move down freely by gravity inside the cooler.

3. The process according to claim 1, wherein the coolant gas is air, and wherein the air is supplied to a lower part of the vertical cooler and withdrawn in a forced manner from an upper part of the vertical cooler.

4. The process according to claim 1, wherein the coolant gas flowing through said vertical cooler is a pulsated gas flow.

5. The process according to claim 3, wherein air is supplied at a position above a discharge position along which the cooled cake is withdrawn from the vertical cooler.

6. The process according to claim 5, wherein the cake is withdrawn from the vertical cooler by at least one conveying screw or at least one moving belt or a combination thereof.

7. The process according to claim 1, wherein the residence time of the cake inside said vertical cooler is from about 1.0 to 10 minutes.

8. The process according to claim 1, wherein the cake leaving the prepress and supplied to the vertical cooler has a temperature of between 85 and 115° C.

9. The process according to claim 1, wherein the coolant gas is ambient air having a temperature when supplied to the vertical cooler of between about 10 to 30° C.

10. The process according to claim 1, wherein the volume of air flowing through said vertical cooler is between about 50 $m^3$ to 200 $m^3$ per ton of cake.

11. The process according to claim 1, wherein the air leaving the vertical cooler is conducted to a heat exchanger device-and subjected to cooling.

12. The process according to claim 1, wherein the cooled cake leaving the vertical cooler is conveyed to a solvent extractor in a continuous manner.

13. The process according to claim 1, further comprising a cooling agent, wherein the cooling agent is supplied to the mechanical prepress or at the exit position where the cake leaves the prepress.

14. The process according to claim 1, wherein said oleaginous vegetable material, which can be dehulled, is selected from the group of the botanical families of the compositae (for example sunflower), cruciferae (for example rape), malvaceae (for example cotton), rozaceae (for example almond tree and hazel tree), peduliaceae (for example sesame), vitaceae (for example grape seed), jugladaceae (for example nut tree), linaceae (for example flax), cucurbitaceae (for example pumpkin seeds), leufobiaceae (for example castor oil plant), solanaceae (for example tomato seeds and tobacco seeds) and arachis hypogaea (for example peanuts), and mixtures of two or more of the afore-mentioned materials.

15. The process according to claim 1, wherein the vertical cooler is airtight connected to the prepress.

16. The process according to claim 3, wherein air is withdrawn by an air suction device.

17. The process according to claim 11, wherein the heat exchanger is a tubular condenser.

18. The process according to claim 13, wherein the cooling agent is selected from the group consisting of nitrogen, carbon dioxide, water, alcohol, either in gaseous, liquid or solid form.

19. The process according to claim 1, wherein the solvent is hexane.

* * * * *